United States Patent [19]

Hanada et al.

[11] 4,335,198

[45] Jun. 15, 1982

[54] PROCESS FOR RECORDING

[75] Inventors: Hiroshi Hanada, Yokohama; Masanao Kasai; Hitoshi Hanadate, both of Tokyo; Yoko Oikawa, Kawasaki, all of Japan

[73] Assignee: Canon Kabushiki Kaisha, Tokyo, Japan

[21] Appl. No.: 38,840

[22] Filed: May 14, 1979

Related U.S. Application Data

[60] Division of Ser. No. 858,161, Dec. 6, 1977, abandoned, which is a continuation of Ser. No. 579,700, May 21, 1975, abandoned.

[30] Foreign Application Priority Data

| May 25, 1974 | [JP] | Japan | 49-59215 |
| Aug. 6, 1974 | [JP] | Japan | 49-90568 |
| Sep. 20, 1974 | [JP] | Japan | 49-108357 |

[51] Int. Cl.³ .......................... B05D 3/02; B05D 3/06; G01D 15/10
[52] U.S. Cl. .................... 430/348; 346/1.1; 346/76 L; 346/135.1; 427/43.1; 427/53.1; 427/56.1; 427/264; 427/271; 428/209; 428/333; 428/639; 428/641; 428/913; 430/945
[58] Field of Search .............. 346/1, 76 L, 135, 135.1; 427/53, 55, 56, 146, 150, 43, 43.1, 53.1, 56.1, 226, 228, 229, 264, 271; 428/332, 333, 457, 469, 471, 472, 913, 914, 138, 209, 212, 215, 216, 639, 641; 430/9, 348, 945

[56] References Cited

U.S. PATENT DOCUMENTS

| 3,314,073 | 4/1967 | Becker | 346/76 L |
| 3,560,994 | 2/1971 | Wolff et al. | 346/135 |
| 3,665,483 | 5/1972 | Becker et al. | 346/135 |
| 3,720,784 | 3/1973 | Maydan et al. | 346/135 X |
| 3,747,117 | 7/1973 | Fechter | 346/135 X |
| 3,889,272 | 6/1975 | Lou et al. | 346/135 X |
| 4,000,492 | 12/1976 | Willens | 346/135 X |
| 4,069,487 | 1/1978 | Kasai et al. | 346/76 L |

Primary Examiner—Bruce H. Hess
Attorney, Agent, or Firm—Fitzpatrick, Cella, Harper & Scinto

[57] ABSTRACT

A recording member includes a recording layer capable of recording in response to applied heat. The heat is produced by absorption of high intensity radiation which defines recording information. The recording layer has a radiation absorption layer and an anti-reflection layer capable of preventing the reflection of radiation at the radiation absorption layer.

10 Claims, 14 Drawing Figures

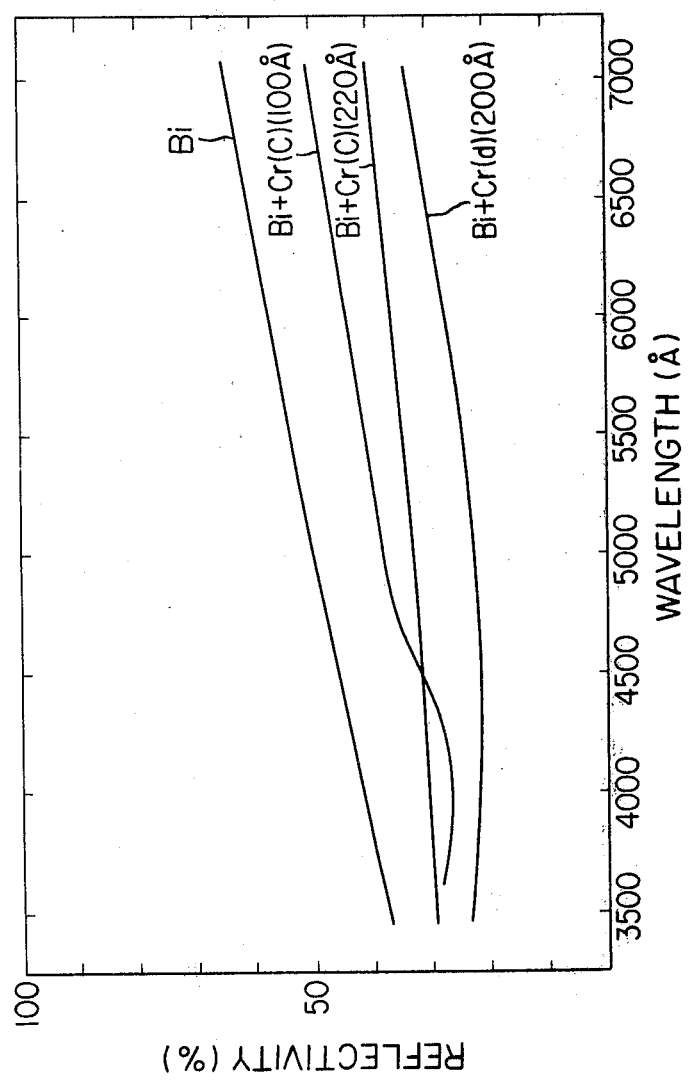

PROCESS FOR RECORDING

This is a division of application Ser. No. 858,161 filed Dec. 6, 1977, now abandoned, which in turn is a continuation of Ser. No. 579,700 filed May 21, 1975, now abandoned.

BACKGROUND OF THE INVENTION

1. Field of the Invention

This invention relates to a recording member and a process for recording, and more particularly, to a heat mode recording member and a process for heat mode recording utilizing the heat mode recording member.

2. Description of the Prior Art

There have been known heat mode recording methods which comprise irradiating a recording medium by condensing a radiation beam of modulated intensity to a spot of high power density, and selectively melting, vaporizing, removing or modifying a part of the recording medium in order to record.

Heat mode recording is real time recording which does not require post-treatments such as heat development, fixation and a treating agent, and can give images of very high resolution and high contrast. Further, the recording medium for heat mode recording is not sensitive to indoor light, and the use of a darkroom procedure is therefore not necessary. Heat mode recording is suitable for recording electric signals such as the output of computers and transmitted time serial signals and add-on is possible. Heat mode recording also has the following advantages. It can be used for recording microimages and ultramicroimages, and for computer output microfilmer, microfacsimile and phototypesetting plate, and can minify the recording apparatus, elevate the function and improve the image quality.

However, at present, heat mode recording has some drawbacks and does not have sufficient practicability. For example, the recording members do not reach a level giving satisfactory sensitivity, resolving power and strength. For example, recording members utilizing a rhodium sputtered film have high strength and durability, but have only low sensitivity and require, for example, a large laser of water-cooled type having a high output. Recording members having a dispersion coating of non-metallic powder such as carbon powder have insufficient sensitivity and low resolving power and, thereby, are not suitable for microimage recording. A recording member utilizing a bismuth vapor-deposited film shows fairly high sensitivity for a metal recording member, but is still not of practically sufficient sensitivity.

Conventional recording members used for recording by deformation of a recording layer caused by thermal action of high intensity radiation do not have sufficient sensitivity, due in large part to reflection of the radiation at the surface of the recording layer. The high intensity radiation is absorbed in the recording layer and converted to thermal energy which, in turn, causes deformation such as melting, evaporation and the like in order to form a record. Therefore, sensitivity of the recording layer depends on the degree of absorption of the high intensity radiation. However, in general, the higher the degree of absorption of radiation by a material, the larger the reflection. The recording layer usually has a smooth surface for forming patterns of high resolution, and this smooth surface results in a high degree of reflection of the radiation. Therefore, the radiation is not effectively absorbed in the recording layer and converted to thermal energy, but is reflected to a great extent. For example, about 70% or more of the irradiated radiation is reflected in the case of metallic recording layers. As the result, the sensitivity is remarkably lowered.

Lowering of sensitivity of the recording layer due to the reflection of the high intensity radiation at the surface of the recording layer is theoretically in proportion to the loss of the radiation energy due to reflection.

However, when the degree of reflection at the surface of a recording layer is, for example, 80%, the loss of the radiation energy can not be always compensated for by increasing the irradiating time up to five times, because the heat generated at the recording layer diffuses to the surroundings by heat transfer. The longer the irradiation time of high intensity radiation, the more remarkable the diffusion of the heat due to heat transfer, and consequently it is very difficult to attain the temperature at which thermal deformation is caused.

SUMMARY OF THE INVENTION

According to the present invention, there is provided a recording member which comprises a recording layer capable of recording with heat caused by absorbing high intensity radiation containing the recording information, the recording layer having a radiation absorption layer and an anti-reflection layer capable of preventing the reflection of radiation at the radiation absorption layer.

According to another aspect of the present invention, there is provided a method for producing a recording member comprising a recording layer composed of a laminate of a radiation absorption layer and an anti-reflection layer, with the recording being made at least in the radiation absorption layer by absorbing high intensity radiation, which comprises forming the anti-reflection layer of a desirable thickness while measuring the degree of reflection of radiation having the same wavelength as that of the high intensity radiation used for recording.

According to a further aspect of the present invention, there is provided a method of recording which comprises irradiating high intensity radiation containing information from the same side as an anti-reflection layer on a recording member having a recording layer composed of a laminate of a radiation absorption layer and an anti-reflection layer capable of preventing reflection of the radiation, the recording being made at least in the radiation absorption layer and thereby producing a thermal deformation at least in the radiation absorption layer.

An object of the present invention is to provide a recording member in which lowering of the sensitivity of the recording member caused by reflection is prevented, thereby maintaining the sensitivity substantially high.

Another object of the present invention is to provide a method for producing the recording.

BRIEF DESCRIPTION OF THE DRAWING

FIG. 1(a)–FIG. 5(a) show diagrammatically enlarged cross sectional views of the recording members according to the present invention;

FIG. 1(b)–FIG. 5(b) show diagrammatically enlarged cross sectional views of the recording member according to the present invention having a recorded pattern;

DESCRIPTION OF THE PREFERRED EMBODIMENTS

Figure 1:
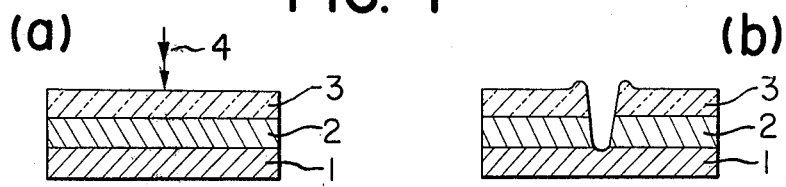
Figure 2:
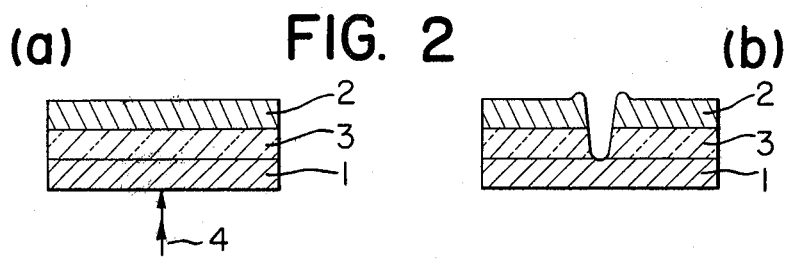
Figure 3:
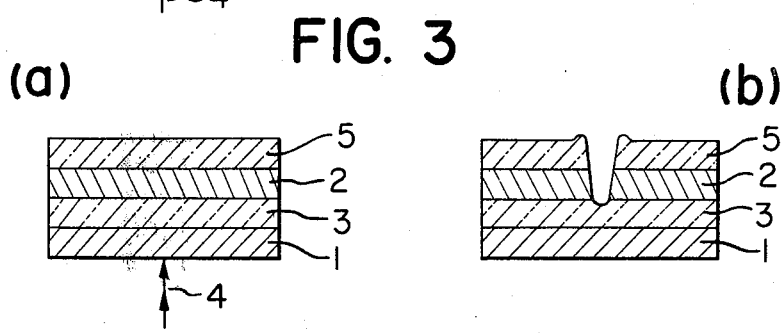
Figure 4:
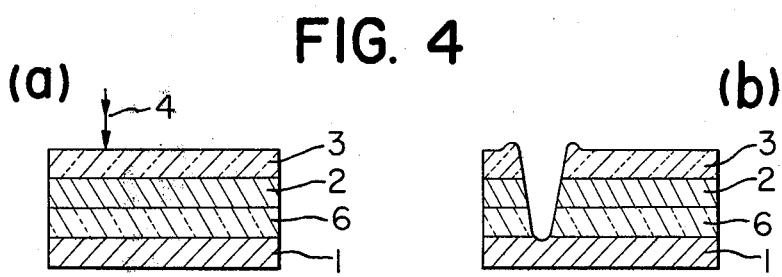
Figure 5:
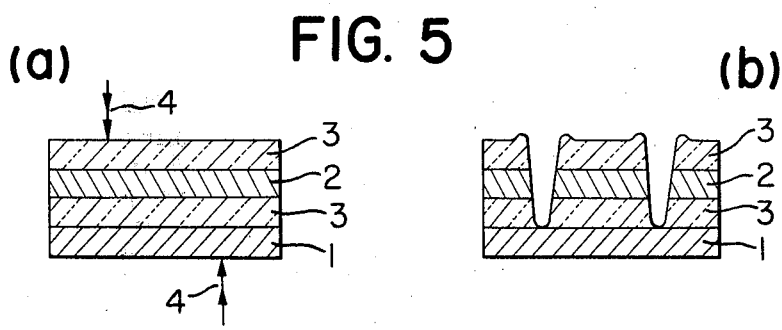

The recording member of the present invention comprises a recording layer composed of a radiation absorption layer and an anti-reflection layer in a laminate form. The anti-reflection layer prevents reflection of high intensity radiation and can effectively transfer the radiation to the radiation absorption layer. Reflection of the high intensity radiation at the interface between the anti-reflection layer and the radiation absorption layer is lowered by the anti-reflection layer and the high intensity radiation is effectively absorbed in the radiation absorption layer and converted to heat. The resulting heat causes a deformation in the radiation absorption layer to carry out the recording. The deformation caused by heat in the radiation absorption layer is transferred to the anti-reflection layer by thermal conduction and/or mechanical action and, as a result, the anti-reflection layer itself is also subjected to deformation. In case of deformation caused by heat conduction, the heat generated in the radiation absorption layer is conducted to the anti-reflection layer and thereby causes a deformation of the anti-reflection layer. In case of deformation caused by mechanical action, the heat generated in the radiation absorption layer causes the deformation of the radiation absorption layer itself and the pressure generated upon deformation of the radiation absorption layer causes the deformation of the anti-reflection layer. Usually the deformation of the anti-reflection layer is caused by heat conduction, mechanical action and heat generated in the anti-reflection layer by absorbing a part of the high intensity radiation. However, the anti-reflection layer is not provided for the purpose of absorbing the radiation.

In a recording member having an anti-reflection layer, the contrast and resolution of the formed pattern mainly depend on the radiation absorption layer in the recording layer, and the sensitivity depends on the combination of the anti-reflection layer and the radiation absorption layer. In particular, with respect to sensitivity, a recording layer having both a radiation absorption layer and an anti-reflection layer in a laminated form shows a far higher sensitivity than a recording layer having only a radiation absorption layer. It is desirable that the radiation absorption layer is made of a substance of low vaporization heat and further the substance can form a stable film and has a large light absorption coefficient. The substance has preferably a vaporization heat of not higher than 10 kcal/cm$^3$ and more preferably not higher than 5 kcal/cm$^3$.

Examples of such preferable substances are metals, but there may also be used carbon, dyes, pigments or a binder resin layer containing a dye or pigment. With respect to the light absorption characteristic, metals usually have a large one and are preferable. The following table shows their metals and the related properties. There may be used alloys composed of two or more metals selected from the following table and alloys composed of one or more metals of the following table with other element(s) as far as stability, heat of vaporization, toxicity of the metals in the table is not adversely affected.

| Metallic element | Heat of vaporization (kcal/cm$^3$) | Boiling point (°C.) |
|---|---|---|
| Ag | 5.90 | 2163 |
| Al | 7.20 | |
| As | 2.53 | |
| Au | 7.73 | 2808 |
| Bi | 1.53 | 1564 |
| Cd | 1.84 | 767 |
| Ce | 4.88 | |
| Cr | 10.43 | |
| Cu | 10.13 | |
| Fe | 11.83 | |
| Ge | 6.02 | |
| In | 3.52 | 2070 |
| Ir | 16.46 | 4389 |
| La | 4.41 | |
| Mg | 2.18 | |
| Mn | 7.61 | |
| Mo | 15.90 | |
| Nd | 3.46 | 3068 |
| Ni | 13.26 | |
| Pb | 2.34 | 1750 |
| Pd | 9.83 | 2964 |
| Pr | 3.27 | 3512 |
| Pt | 14.00 | 3824 |
| Rh | 14.21 | 3727 |
| Sb | 2.46 | 1587 |
| Si | 3.48 | |
| Sn | 4.02 | 2623 |
| Ti | 9.43 | |
| Zn | 2.93 | 911 |
| Zr | 9.77 | |

In the present invention, the thickness of the radiation absorption layer is preferably 50–5000 Å, and more preferably, 100–1000 Å. In the range of such layer thickness, it is easy to attain a high contrast such as higher than 2 of optical density by the radiation absorption layer alone.

When the layer thickness is too thin, it is not easy to obtain a high contrast. On the contrary, when the layer thickness is too thick a larger amount of radiation energy is necessary.

The radiation absorption layer may be formed by any optional method. For example, when a radiation absorption layer is prepared with a metal, a thin radiation absorption layer can be easily prepared by vacuum evaporation or sputtering. Most of the radiation absorption layers show a high degree of reflection and therefore, for example, only a half or less than one third of the radiation energy is converted to heat.

The loss of radiation energy due to reflection is one cause of lowered sensitivity of the radiation absorption layer. The other cause of lowered sensitivity of the radiation absorption layer is the relation between the thermal conduction and the period of time the high intensity radiation is applied. That is, the recording velocity (deformation by heat) in the radiation absorption layer is determined by (1) the radiation energy absorbed in the radiation absorption layer, (2) the heat amount per unit volume necessary to cause a deformation in the radiation absorption layer,
(3) the thickness of the radiation absorption layer, and
(4) the heat diffusion caused by heat conduction.

Among the above mentioned factors, the heat diffusion by heat conduction increases in proportion to the radiation energy irradiating period. Therefore, a long period of time for irradiating the radiation energy can increase the amount of heat energy given to the radiation absorption layer, but most of the resulting heat is dissipated by heat conduction and fails to cause a deformation in the radiation absorption layer.

Further, the heat conduction causes a deformation at a part surrounding the irradiated portion and thereby the resolution is lowered. Thus, the sensitivity of the radiation absorption layer is lowered, to a great extent, by the reflection.

The anti-reflection layer is used for the purpose of preventing the reflection at the surface of the radiation absorption layer and can improve the sensitivity and resolution of the recording member. The thickness and material of the anti-reflection layer is appropriately selected depending upon the thickness, material of the radiation absorption layer and the high intensity radiation used. A material for the anti-reflection layer is preferably that capable of forming a thin film of less than one micron thick. It is preferred to decrease the reflection to less than one half by using the anti-reflection layer, more preferred with to less than one third.

For the purpose of preferable embodiments of the present invention, other various characteristics are necessary for the anti-reflection layer, but it is not always necessary to satisfy all of them. Those characteristics are as shown below.

(A) The transmissivity of the anti-reflection layer for a radiation having the same wavelength as that of the high intensity radiation used is far higher than that of the radiation absorption layer.

(B) Degree of absorption of the anti-reflection layer with respect a radiation having the same wavelength as that of the high intensity radiation used is far lower than that of the radiation absorption layer.

(C) The anti-reflection layer does not disturb the heat deformation such as vaporization, melting and the like of the radiation absorption. For this purpose, it is preferable that the anti-reflection layer be melted or vaporized by a heat energy which is the same as or preferably less than that capable of deforming the radiation absorption layer. For example, a melting point of less than 1000° C., preferably less than 800° C., is desirable. When the anti-reflection layer is, for example, melted and changes to a liquid form, it is easily dissipated simultaneously with vaporization of the radiation absorption layer.

In general, a thermal energy necessary for raising a temperature and heat of fusion are relatively smaller than heat of fusion and negligible.

(D) However, for this purpose it is desirable that the film thickness be as thin as possible, and a thickness less than one micron, particularly less than 0.5 microns is preferable. It is preferable that the thickness of the anti-reflection layer be controlled within accuracy of 1/100, particularly 1/1000, or a higher accuracy to form the film with the desirable thickness for effectively preventing reflection. Strict control of the film thickness is desirable because the anti-reflection effect is seemingly attributed to lowering of degree of reflection caused by the interference effect of the anti-reflection layer.

Representative materials effective for forming an anti-reflection layer are metals such as Cr, Sn, Ge, Si and Ti, metal oxides such as oxides of In, Ti, Sn, W, Si, Zr, Pb, Cr, Fe and V, chalcogen elements such as S, Se and Te, and chalcogen compounds, that is, compounds containing chalcogen element(s). The component ratio of chalcogen compounds may be continuously changed and even if the components are the same, various chalcogen compounds having a component ratio can be obtained. Representative chalcogen compounds are compounds composed of one or more of chalcogen elements and at least one of As, Sb, P, Ge, Si, Ti and other metals, and halogen. In particular, chalcogen compounds composed of S as chalcogen element and at least one of Ge, In, Sn, Cu, Ag, Fe, Bi, Al, Si, Zn and V are preferable.

When both the anti-reflection layer and the radiation absorption layer are metallic layers, these metals are preferably different from each other so as to form an interface therebetween.

The transmissivity of the anti-reflection layer itself as to a radiation having the same wavelength as that of the high intensity radiation is preferably higher than 10%. The transmissivity of the radiation absorption layer itself as to a radiation having the same wavelength as that of the high intensity radiation used is preferably less than 5%.

The anti-reflection layer absorbs radiation having the same wavelength as that of the high intensity radiation used although the degree of absorption is far less than that of the radiation absorption layer. It is preferable that the degree of absorption of the anti-reflection layer itself as to the radiation is not smaller than 0.1% in case of an anti-reflection layer having a thickness of the light length being $\lambda/4$ when the wavelength of the high intensity radiation is $\lambda$.

The remarkably advantageous effect of the anti-reflection layer is particularly obtained when a radiation absorption layer having a degree of reflection of higher 50% has the anti-reflection layer applied thereto.

The present invention will be explained by referring to the attached drawings.

FIG. 1(a)–FIG. 5(a) show representative embodiments of recording members according to the present invention.

In the Figures, numeral 1 denotes a support such as glass, film paper, metal and the like. The film includes organic high polymer films such as polyesters, acetates, polyethylene and the like. The support is transparent to the high intensity radiation employed when recording radiation is effected from the side of the support. Numeral 2 denotes a radiation absorption layer, 3 denotes the anti-reflection layer and 4 denotes the high intensity radiation for recording. There may be used a tungsten lamp, xenon lamp, high pressure mercury lamp, ultra-high pressure mercury lamp, arc lamp or a sodium lamp as a source of the high intensity radiation. Various lasers may also be used. Laser gives the most preferable embodiment of the present invention. In the present invention, the high intensity radiation includes ultra-violet radiation, visible radiation and infra-red radiation. Radiation from a radiation source is focused or a radiation source capable of emitting high energy radiation is employed so that the high intensity radiation having recording information has a high energy density sufficient to deform, that is, to record, a recording layer by heat.

Many kinds of lasers for various wavelengths are known. All of these lasers give a favorable emmbodiment for the present invention. Representative lasers used in the present invention are listed below:

| Laser | | Wavelength(mμ) |
|---|---|---|
| He-Cd laser | | 442 |
| | | 325 |
| Ar ion laser | | 488 |
| | | 515 |
| | | 633 |
| He-Ne laser | | 1150 |
| Semiconductor laser | (AlGaAs) | 820 |
| | (GaAs) | 905 |
| | Nd: YAG laser | 1060 |
| | | 530 (second harmonics) |
| | $CO_2$ laser | 10600 |

In FIG. 3(a), numeral 5 denotes a protecting layer for the radiation absorption layer. The protecting layer may be formed of an ordinary synthetic resin or the same material as that of the anti-reflection layer.

Figure 6:
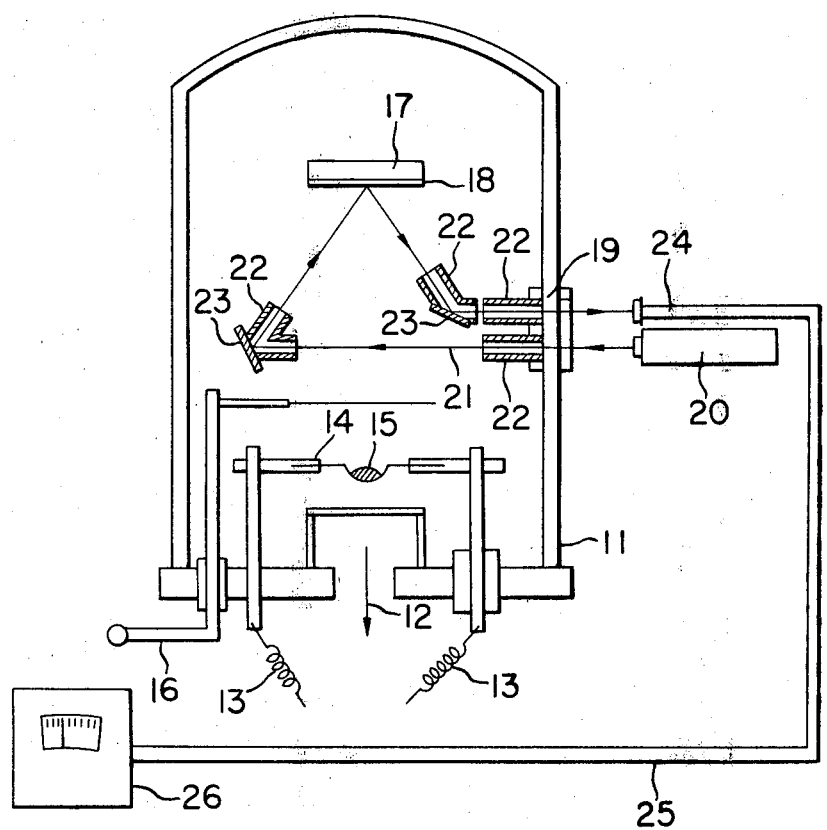
FIG. 6 is an embodiment of a vapor depositing apparatus used for producing a recording member of the present invention.

In the latter case, when the thickness of the protecting layer is controlled and a reflection preventing effect is given, the struction of the recording layer becomes as illustrated in FIG. 5(a) and a high sensitive recording can be effected from either side of the recording member. In FIG. 4(a), 6 denotes an intermediate layer which serves to reinforce the adhesivity between the support and the radiation absorption layer when the adhesivity is not strong enough to provide a mechanically durable recording member. It is recommended that the intermediate layer be formed by thinly coating a resin such as epoxy resin, silicon resin, vinyl resin or gelatin when the support is a glass or film of an organic compound. In order to obtain a desirable anti-reflection effect, the thickness of the anti-reflection layer is designed in accordance with the high intensity radiation to be used. For example, the thickness of the anti-reflection layer may be determined depending upon the data derived from the wavelength of the high intensity radiation to be used, or may be determined by preparing various recording members having different thicknesses and measuring the reflection preventing effect. A recording member as the final product is produced, based on the above determined thickness of the anti-reflection layer.

Upon forming the anti-reflection layer, the thickness of the anti-reflection layer may be directly determined by monitoring the reflection while using a light having the same wavelength as that of the high intensity radiation. Also, a simple and highly precise method is to measure the thickness simultaneously during the formation of the anti-reflection layer. Such method is commercially valuable from a practical point of view. According to this method, upon forming an anti-reflection layer on a radiation absorption layer, the anti-reflection layer is provided at a certain thickness capable of imparting a reflection preventing effect to the anti-reflection layer and the anti-reflection layer is produced while its reflectivity is being determined, with a radiation having the same wavelength as that of the high intensity radiation to be used. For example, upon forming the anti-reflection layer, a radiation having the same wavelength as that of the high intensity radiation, preferably, a high intensity radiation having the same wavelength is used for directly monitoring the reflection characteristic, and the reflection preventing effect is determined in real time so that the anti-reflection layer is produced until it reaches a certain thickness at which the desired reflection preventing effect is obtained.

An embodiment of the production of an anti-reflection layer according to the above mentioned method is illustrated in FIG. 6, which shows schematically an apparatus for producing an anti-reflection layer. A material 15 for forming the anti-reflection layer is placed in a vaporization boat 14. A vacuum vessel 11 is kept in a vacuum state by exhausting with an exhausting system 12. Boat 14 is heated up to the vaporization temperature by applying electric current from electrodes 13 and the vapor-depositing material 15 is vaporized and deposited on a member composed of a support 17 and a light absorption layer 18. During the vapor-deposition, as a radiation having the same wavelength as that of the high intensity radiation, there is used a laser beam 21 emitted from a laser beam source 20. The laser beam 21 travels through pipes 22 for preventing contamination of the light path and is reflected by reflection mirrors 23 before and after reaching the vapor-deposition surface. The reflected laser beam passes through a window 19 in accordance with the arrow direction by mirror 23 and reaches a detector 24. The quantity of laser light received by detector 24 is indicated in a reflected light measuring meter 26 by way of connecting wires 25. The pipes 22 are provided at necessary portions for preventing contamination of light path caused by the vapor-depositing material. In this way, the vapor-deposition is conducted while monitoring with a reflected light indicating meter and the vapor-deposition is stopped when the reflected light becomes minimized. For stopping the process, a shutter 16 is actuated to intercept the vapor-depositing material and, as a result, an anti-reflection layer having an optimum thickness for preventing reflection has been formed on a radiation absorption layer 18 to produce a recording member. Upon producing recording member as illustrated in FIG. 2(a)–FIG. 5(a), the order of forming each layer is optionally changed. For example, an anti-reflection layer is formed on a radiation absorption layer and then a support layer is provided thereon. In this case, the monitoring may be made as to the thickness of the radiation absorption layer. In case of a recording member to which a recording light, e.g. a laser beam is applied from the support layer side, the monitoring may be made from the support layer side upon forming an anti-reflection layer.

Irradiation of high intensity radiation to a recording member is conducted by applying a high intensity radiation subjected to position modulation or intensity modulation according to the recording information. Further, it may be conducted by applying high intensity radiation to a recording member through an original having a portion nontransparent to radiation and a portion transparent to radiation. In this case, the high intensity radiation may be applied to the recording member in such a manner that the original is scanned with the radiation.

FIG. 1(b)–FIG. 5(b) show recording members having a record caused by irradiating recording members of FIG. 1(a)–FIG. 5(a) with high intensity radiation.

The irradiated light is mainly absorbed in the radiation absorption layer, but a part of the irradiated light is also absorbed at an anti-reflection layer. The radiation energy absorbed is converted to thermal energy to raise the temperature of the whole recording layer. In FIG. 1(b)–FIG. 2(b), there are shown the states in which the concave portions are formed due to thermal deformation of a radiation absorption layer 2 and an anti-reflection layer 3. The formation of the concave portions is due to vaporization or melting due to irradiation followed by rapid heating.

When the irradiated high intensity radiation is strong, the concave portion is formed even in support layer 1. On the contrary, when weak, the depth of the concave portion as in FIG. 1(b) does not reach the whole thickness of the radiation absorption layer. In case of FIG. 2(b), the concave portion does not reach the whole depth of the anti-reflection layer. When the high intensity radiation does not have sufficient radiation energy for forming a concave portion in the recording layer, but its radiation energy is sufficient to melt the recording layer, the concave portion as shown in FIG. 1(b) and FIG. 2(b), but there forms a frost portion (the anti-reflection layer and the radiation absorption melt temporarily and then cool to form a surface having minute unevenness). FIG. 3(b) shows a concave portion in the radiation absorption layer and a protecting layer, formed by irradiation of high intensity radiation. There is a case such that a concave portion is formed up to the anti-reflection layer in accordance with the intensity of the irradiated high intensity radiation and a case that the concave portion is formed further up to the support layer. When the irradiated high intensity radiation is weak, there is a case such that a concave portion is formed partially in the direction of thickness of the radiation absorption layer and a case where only a frost portion is formed as a result of melting of the recording layer.

FIG. 4(b) shows a concave portion formed in an anti-reflection layer, a radiation absorption layer and an intermediate layer. In this case, there are also various cases depending upon the intensity of the high intensity radiation used, i.e. the concave reaches the support layer, or the concave reaches only the anti-reflection layer and the radiation absorption layer when the high intensity radiation is weak, or only frost portions are formed when the radiation is weaker.

FIG. 5(b) shows concave portions which are formed in both anti-reflection layers and a radiation absorption layer. In this case, there are also the various cases as mentioned above referring to FIG. 4(b).

The various records thus obtained can be regenerated by a reflected light, a transmitted light, or detecting mechanically the concave portion.

Figure 7:
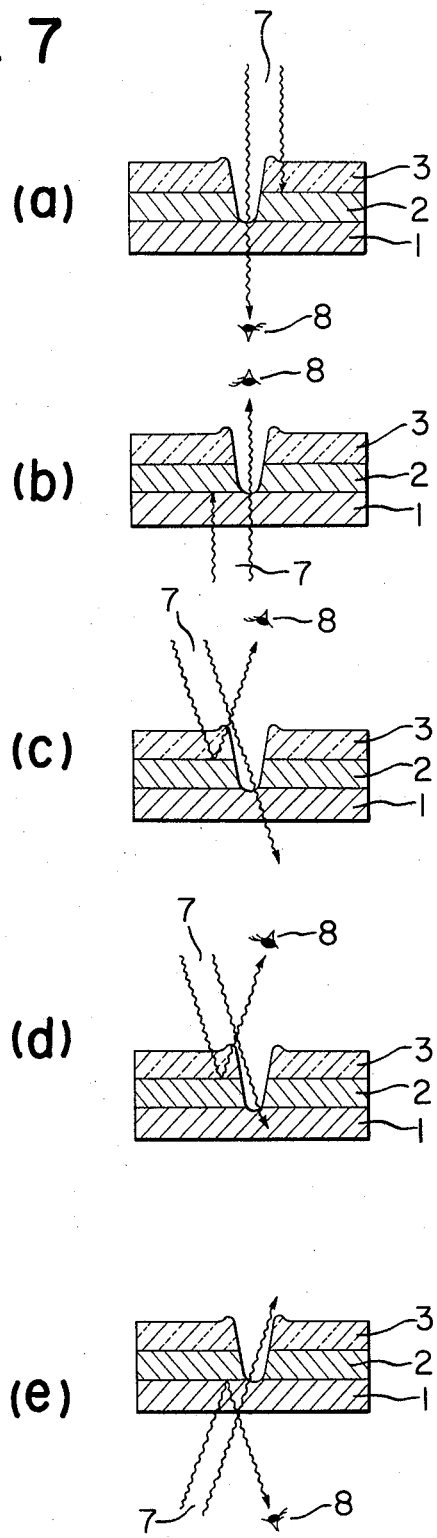
FIG. 7(a)-(e) is an embodiment of a method for finding a record on the recording member according to the present invention.

FIG. 7 shows an example for optically observing a record and the relation between the position of an illuminating light 7 and the light receiving member 8. The recording member in FIG. 1(b) is taken as the example, but other recording members are also the same as above. FIG. 7(a) and (b) show a read-out by a transmission mode. FIG. 7(c), (d) and (e) are read-outs by a reflection mode. In (c) and (d), the recording layer shows a low reflectivity as to a particular wavelength, but as to the other wavelength, it shows a high reflectivity so that even a surface reflection renders a read-out of a sufficiently high contrast possible. Particularly, in case of (d), the support is a radiation absorption layer. FIG. 7(e) shows a reflection mode read-out from the back side.

When the record is that mode by the formation of a frost portion, the read-out can be effected by a scattering light or light intercepting effect at the frost portion.

In the case of recording members having an anti-reflection layer or a protecting layer on the surface as shown in FIG. 1(b), FIG. 3(b), FIG. 4(b) and FIG. 5(b), after applying high intensity radiation, the upper layer, that is, the anti-reflection layer or the protecting layer, may be removed, if desired. This removal may be conducted by dissolving the anti-reflection layer and the protecting layer with a solvent capable of dissolving then only, or by selectively vaporizing the anti-reflection layer and the protecting layer by heating when the heat of vaporization of the anti-reflection layer and the protecting layer is lower than that of other layers. In such case, the vaporization and removal (not the heating by irradiation of a radiation) may be effected under vacuum. Further, this removal may be conducted by a mechanical means such as friction or rubbing.

In the present invention, there may be used various semiconductor lasers for the high intensity radiation.

Semiconductor lasers may be used in a way similar to other lasers but, as mentioned later, particular characteristics of semiconductor lasers can be effectively used.

When a light flux of a high intensity radiation is formed into a minute spot on a recording member by using a condensing means to apply a minute processing to or a pattern inscription to an article, a high magnification lens having a short focal length, for example, an objective lens for a microscope of 20 to 100 magnification, is usually used and the focal depth is very small, for example, only from several to several tens microns. Therefore, it is necessary to form a minute spot exactly on an the article. There are used various devices for ascertaining whether a minute spot is exactly formed on a recording member or whether the size is the desired one.

The invention will be understood by reference to the following examples. However, these examples are intended to illustrate the invention and are not to be construed to limit the scope of the invention.

REFERENCE EXAMPLE

Figure 14:
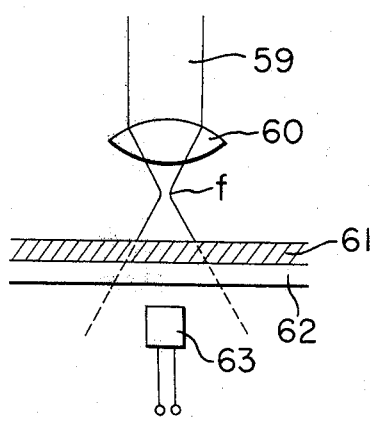
Figure 15:
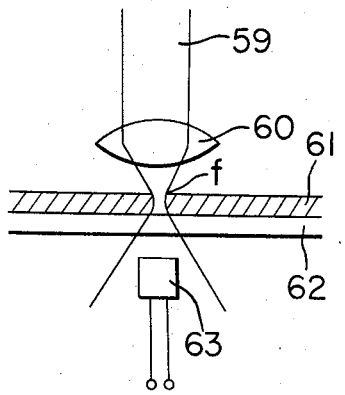
Figure 16:
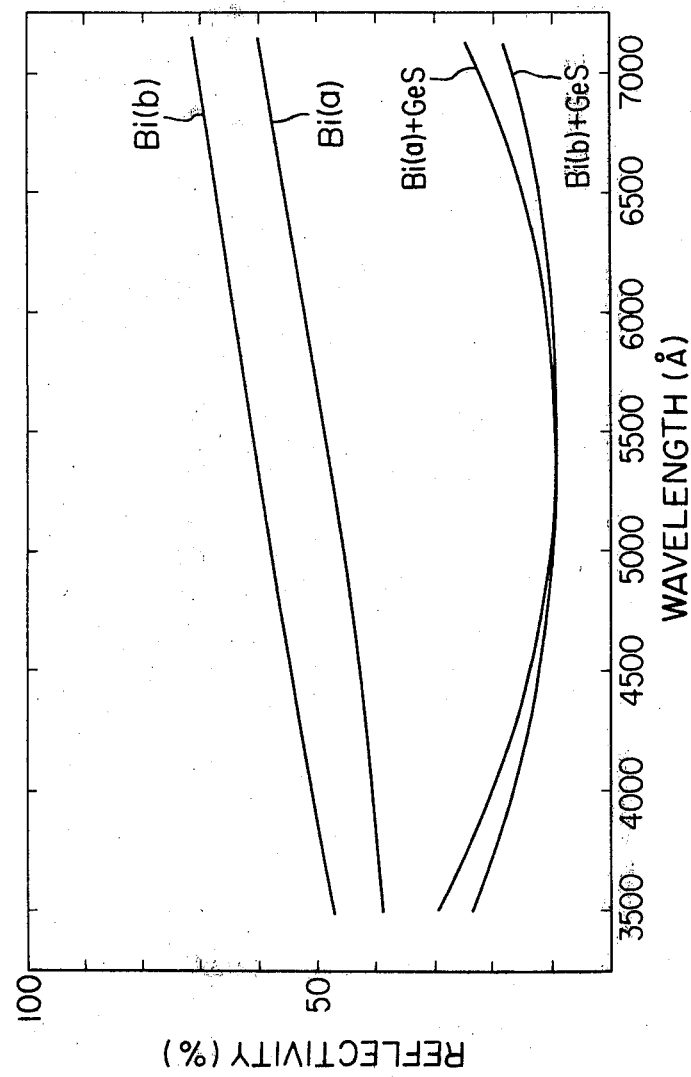
Figure 17:
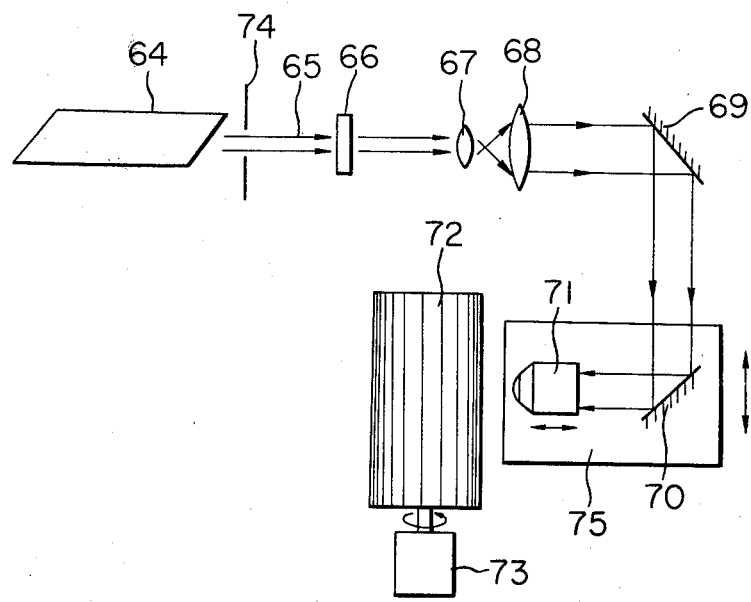
Figure 26:
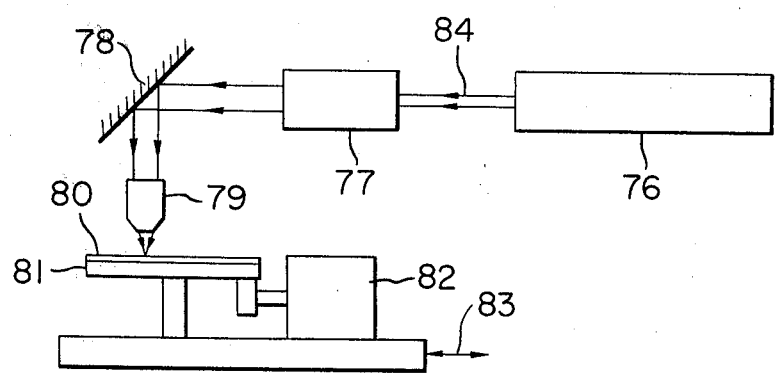
Figure 19:
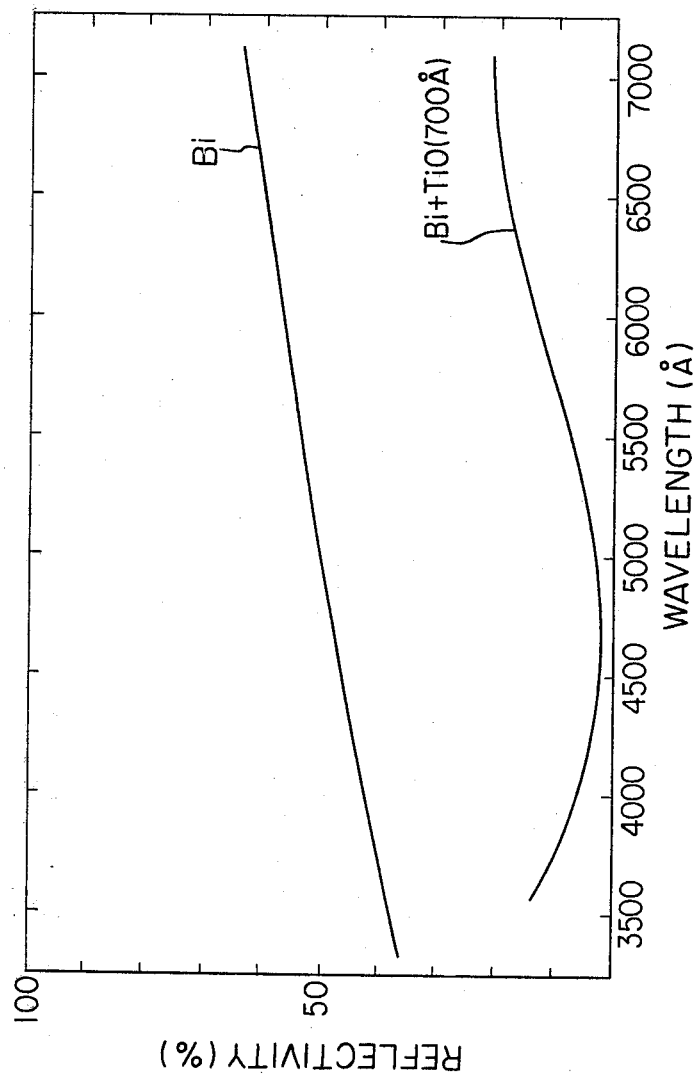
Figure 20:
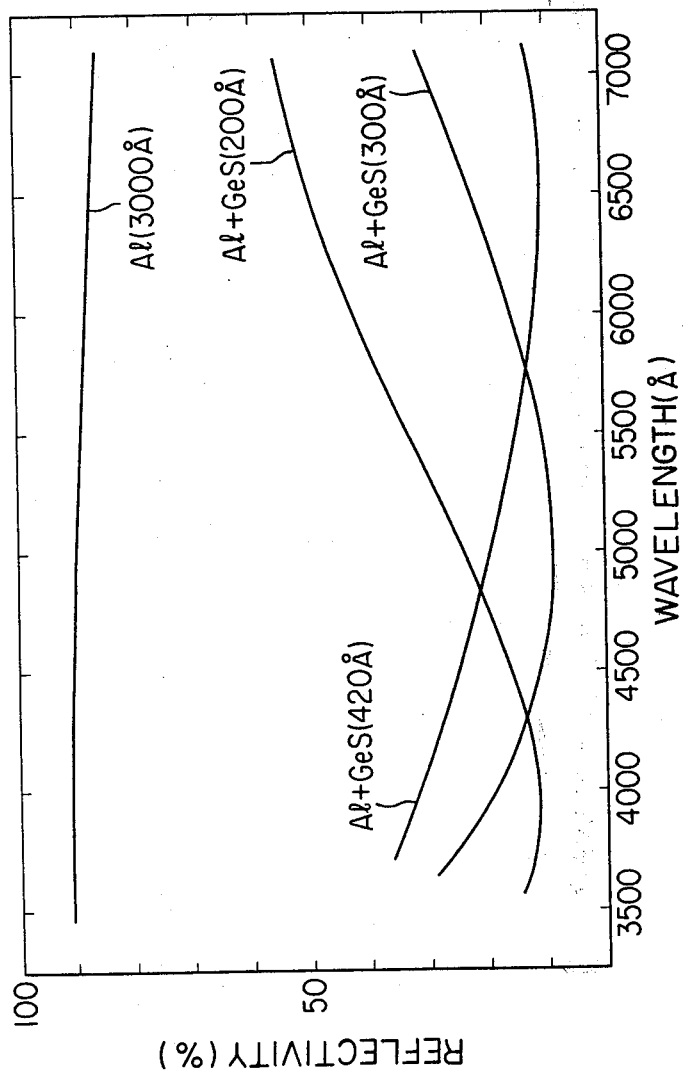
Figure 21:
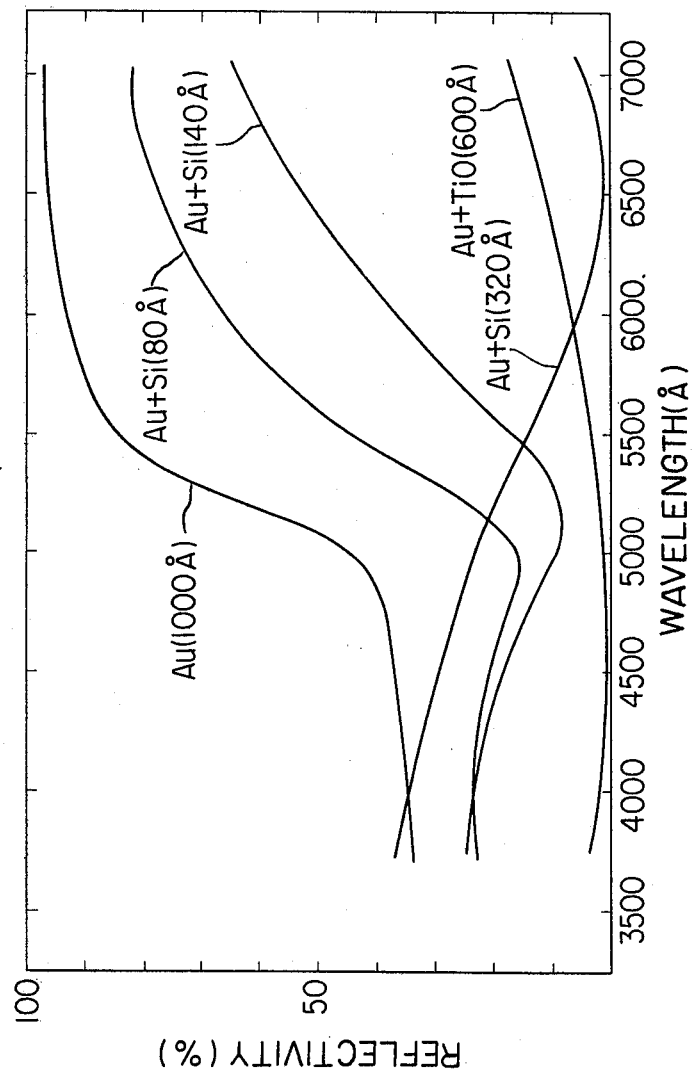
Figure 22:
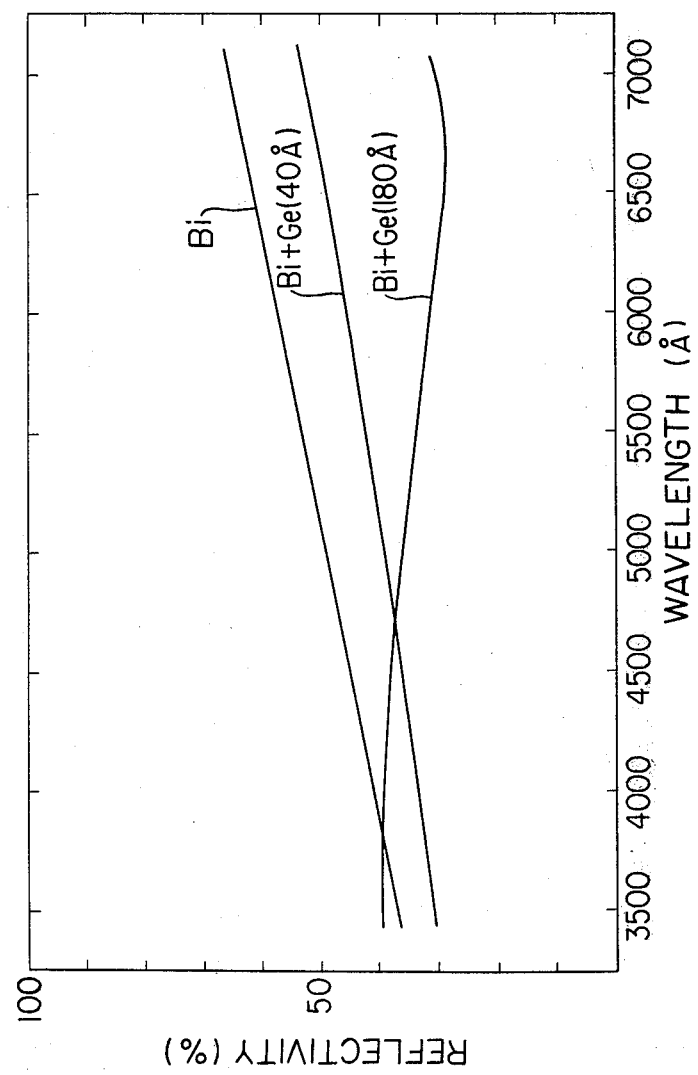
Figure 23:
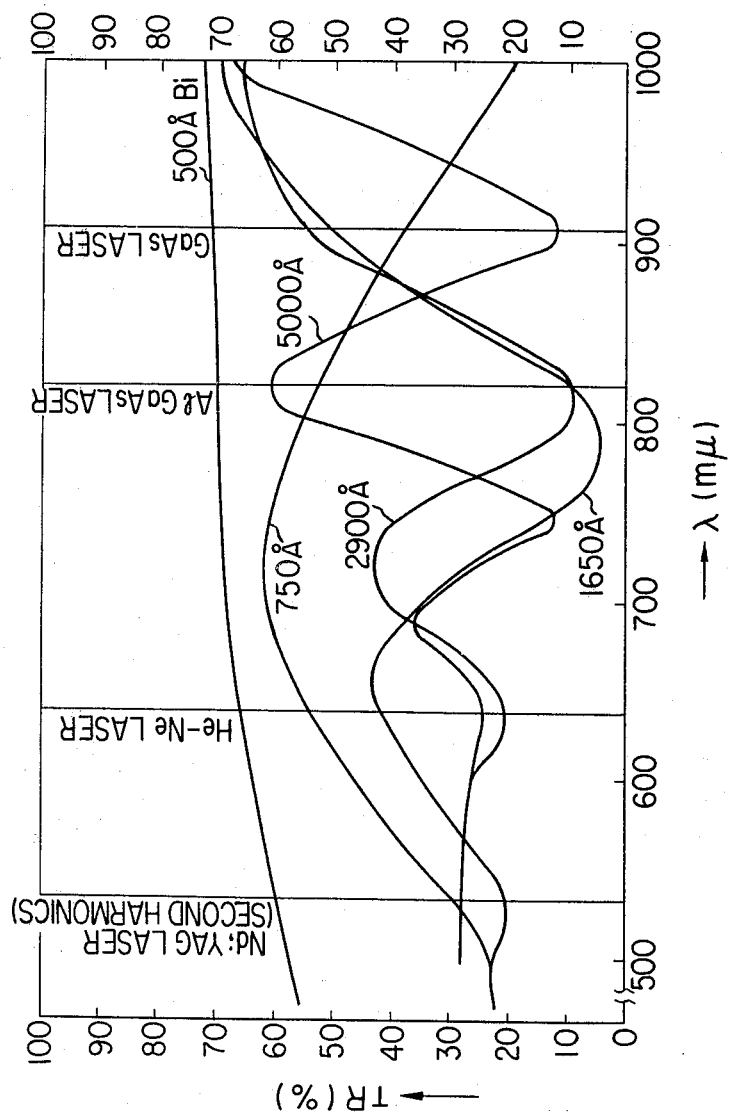
Figure 24:
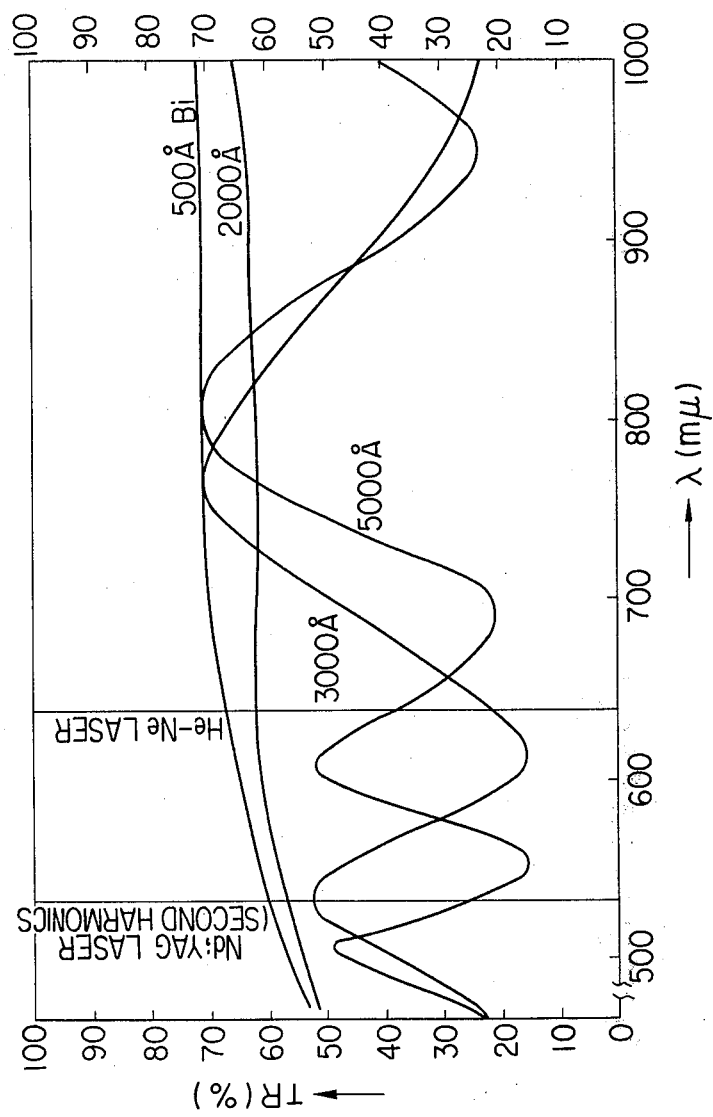
Figure 25:
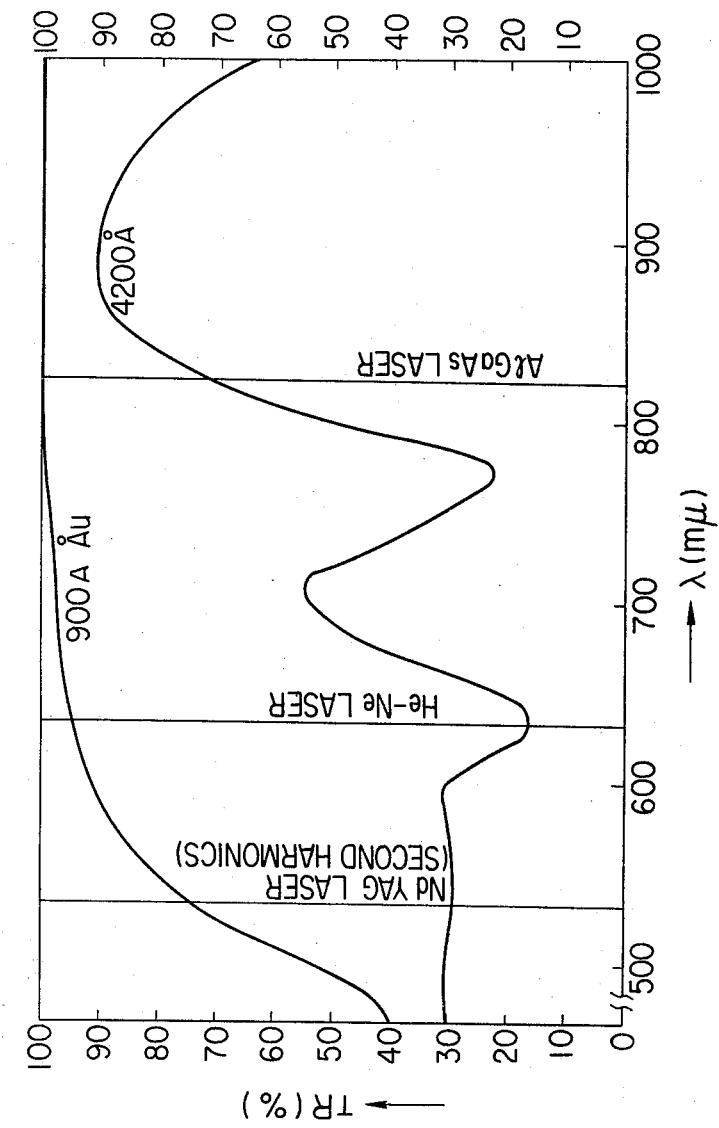
Figure 27:
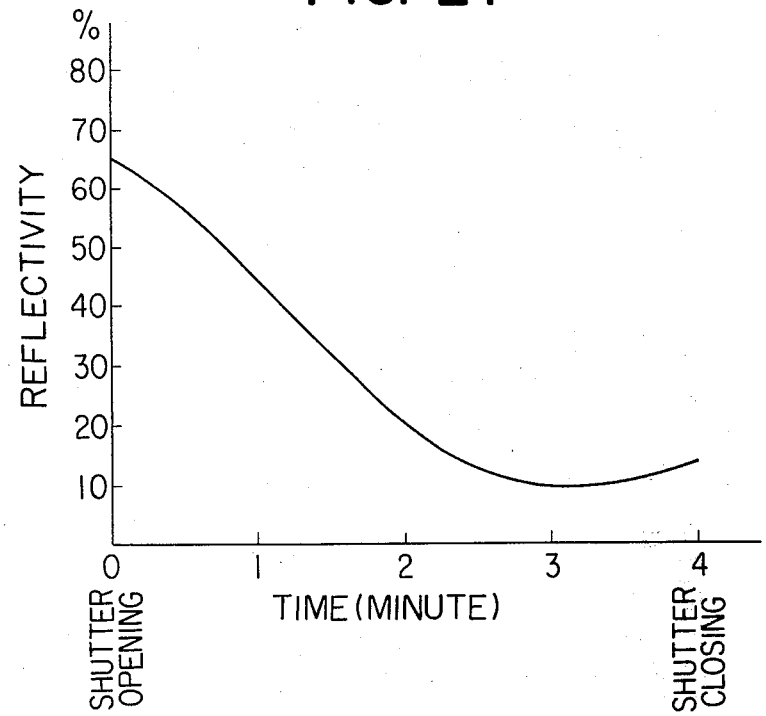
Figure 28:
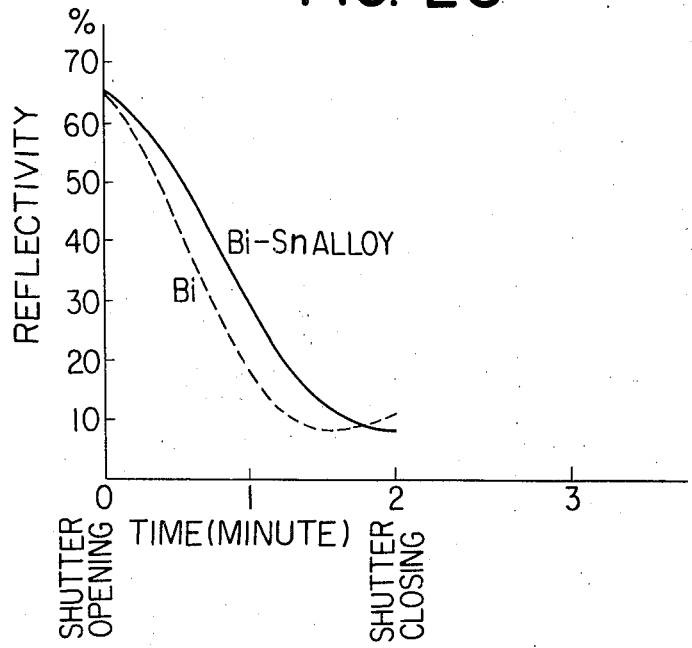

Germanium (Ge) was used as the material of an anti-reflection layer and vapor-deposited to a support by the resistance heating method, while keeping the temperature of the support at room temperature, and the bismuth (Bi) film having a thickness of 1000 Å as a radiation absorption layer to prepare a laminate recording layer. The spectral reflectivity of the recording member is shown in FIG. 14.

As clearly understood from the Figure, the reflectivity was hardly improved at the wavelength of an argon laser at 4880 Å. When the thickness of the germanium (Ge) film was made large, the reflectivity, although not shown, rather increased. As a result of the evaluation of the sensitivity, it was found that the relative sensitivity did not improve, but rather decreased.

EXAMPLE 1

A glass disk having a thickness of 2 cm and a diameter of 30 cm was used as a support, to which aluminum (Al) was vapor-deposited to form a radiation absorption layer having a thickness of 500 Å. The deposition condition of the aluminum (Al) was as shown in the following.

Material: Aluminum wire having a diameter of 1 mm and a purity of 99.999%.
Depositing procedure: Resistance heating method using a tungsten coil.
Vacuum degree: $2 \times 10^{-5}$ Torr
Support temperature: About 150° C.
Distance between vaporization source and support: 25 cm The Al deposited film was measured with respect to the spectral characteristics to find that at a wavelength of 4900 Å, the light reflectivity was 90% and the light transmissivity was 0.1%. Further, silicon oxide was vapor-deposited to the Al deposited film to form an anti-reflection layer having a thickness of 480 Å. The deposition condition was as shown below.

Material: Silicon oxide

Depositing procedure: Resistance heating method of indirect heating type in which the material was placed in a porcelain crucible and heated by using a tungsten coil.

Vacuum degree: $1 \times 10^{-5}$ Torr

Support temperature: 150° C.

Distance between vaporization source and support: 40 cm

The light reflectivity of the laminate recording member thus obtained was decreased to 73% at a wavelength of 4900 Å.

On the contrary, only silicon oxide was vapor-deposited to a glass plate having a thickness of 1 mm under the same condition in order that the thickness of the silicon oxide film might be 680 Å and the optical path length might be about $\lambda/4$ ($\lambda = 4990$). It was found that the light absorption rate of the silicon oxide deposited on the glass plate was about 0.8%.

Both of the above-mentioned recording members of the laminate (Al + Silicon oxide) and that having only the above-mentioned radiation absorption layer (Al alone, 500 Å in thickness) were recorded to use them as video disks in the following manner.

The above-mentioned glass disk was firmly fixed to one end of a shaft connected to a motor and rotated at a speed of about 1800 rpm. The laser light from an argon laser (4880 Å in wavelength, 1 W in maximum output) was introduced into an electro-optical element, frequency-modulated by a video signal and condensed onto the surface film of the above-mentioned recording member by a microscope objective lens having a working distance of about 70 microns. At that time, the lens was set so as to move in the radius direction by about two microns per one revolution of the glass disk and record the signal in spiral shape.

Both of the above-mentioned recording members were compared with each other with respect to the laser output required for the most desired recording in the above-mentioned recording procedure. Due to the formation of the anti-reflection layer, the sensitivity of that recording member was about 1.5 times greater.

Further, the recorded portions of both recording members were observed by means of a scanning-type electron microscope and optical microscope. As the result, in the recording member having the radiation absorption layer and the anti-reflection layer, deformation was recognized not only in the aluminum (Al) deposited layer (radiation absorption layer) but also in the anti-reflection layer of silicon oxide. The deformation was considered to be caused by melting and evaporation. Further, in the case of the recording member having the radiation absorption layer and the anti-reflection layer, it was found that crack in the deposited film and flur in the periphery of the recorded region were eliminated to a great extent, which characteristics were observed in the recording member having only the Al deposited film, and that a good recording was obtained.

EXAMPLE 2

The same recording member as that in Example 1 was prepared in the same manner except that platinum (Pt) and zirconium oxide were vapor-deposited as a radiation absorption layer and anti-reflection layer, respectively, under the condition shown below. The same test as that in Example 1 was repeated.

|  | Radiation absorption layer | Anti-reflection layer |
|---|---|---|
| Material | Pt | $ZrO_2$ |
| Depositing method | Resistance heating deposition using tungsten coil | Electron beam heating deposition |
| Pressure | $2 \times 10^{-5}$ Torr | $1 \times 10^{-5}$ Torr |
| Support | Glass disk |  |
| Distance* | 30 cm | 40 cm |
| Support temperature | Room temperature | 150° C. |
| Thickness | 500Å | 480Å |

*Distance between the vaporization source and support.

On the other hand, only zirconium oxide was vapor-deposited to a glass plate so that the optical path length can be about $\lambda/4$ at a wavelength of 4900 Å and the thickness can be 580 Å. The material thus prepared was found to be about 0.5% in its light absorption rate.

With respect to the light reflectivity of the foregoing deposited film, that of the Pt deposited film alone was about 61.8% at a wavelength of 4900 Å, while that of the recording member having the radiation absorption layer of the Pt film and the anti-reflection layer was reduced to about 18%.

Further, both the recording member having the Pt-deposited film alone and that having the Pt-deposited film and anti-reflection layer were recorded with a video signal in the same manner as that in Example 1. It was found that due to the formation of the anti-reflection layer on the Pt deposited film, the sensitivity was about two times as high as the case of the Pt deposited film alone. Furthermore, as the result of the observation of the recorded region in the recording member having the Pt deposited film and anti-reflection layer by using a scanning type electron microscope, it was found that deformation occurred also in the recorded region of the anti-reflection layer. The deformation is considered to occur due to the melting and evaporation.

EXAMPLE 3

Figure 8:
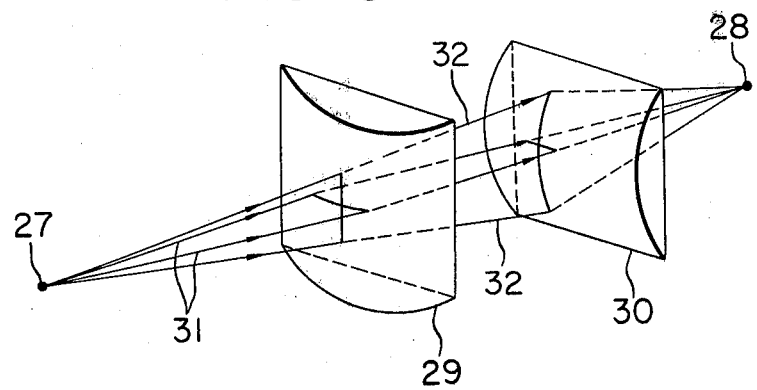
FIGS. 8, 9, 10 and 14 are graphs showing optical characteristics of recording members according to the present invention.

A recording member was prepared under the conditions shown below. The spectral total reflectivity thereof at the side of the recording layer was compared with that of the bismuth (Bi) layer to show the result in FIG. 8. The total reflectivity is represented by "TR" in the Figure.

|  | Deposition condition | |
|---|---|---|
|  | Radiation absorption layer | Anti-reflection layer |
| Material | Bi | $Ge_{50}S_{50}$ |
| Form of material | Powder | Block |
| Vaporization amount | 50 mg | 100–300 mg |
| Boat material | W (10mm in width) | Ta |
| Boat temperature | About 900° C. | About 700° C. |
| Boat input | 20 Å | 85 Å |
| Support | Polyester film (25μ in thickness) | Bi-deposited polyester film |

-continued

| Deposition condition | | |
|---|---|---|
| | Radiation absorption layer | Anti-reflection layer |
| Support temperature | Room temperature | Room temperature |
| Distance* | About 19 cm | About 26 cm |
| Vacuum degree** | $1 \times 10^{-5}$ Torr | $5.3 \times 10^{-6}$ Torr |
| Deposition time | 35 sec. | 40 sec. — 6 min. |
| Thickness | About 500Å | 750Å, 1650Å, 2900Å, 5000Å |

*Distance between vaporization source and support.
**Vacuum degree during deposition.
***The thickness was obtained in such a manner that the thickness of the layer was controlled by a film thickness controller and measured by a monitor sample.

On the other hand, the spectral transmissivity of the laminate of the radiation absorption layer and anti-reflection layer was 1% or less within the range of the wavelengths shown in the Figure. As shown in the Figure, the light absorption of the laminate with respect to each laser wavelength increases by two times as compared with that of the radiation absorption layer.

The test with respect to laser recording of each of the above-mentioned samples was made, and the results are shown in the following table.

| Recording layer | Laser | Sensitivity (erg/cm2) |
|---|---|---|
| Bi (500Å) | He-Ne (20mW) | $6 \times 10^6$ |
| | AlGaAs (peak 1W, pulse) | $7 \times 10^5$ |
| | GaAs (peak 1W, pulse) | $7 \times 10^5$ |
| Bi(500A) + Ge$_{50}$S$_{50}$ (2900A or 5000Å) | He-Ne (20mW) | $1.5 \times 10^6$ |
| Bi(500A) + Ge$_{50}$S$_{50}$ (1650A or 2900Å) | AlGaAs (peak 1W, pulse) | $1 \times 10^5$ |
| Bi(500A) + Ge$_{50}$S$_{50}$(5000Å) | GaAs (peak 1W, pulse) | $1 \times 10^5$ |

The measurement of the sensitivity was carried out in the following manner.

Figure 11:
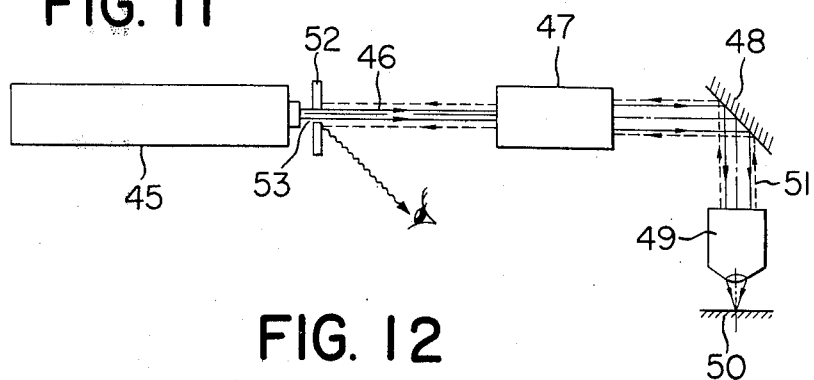
FIG. 11 is an embodiment of a recording apparatus.

As shown in FIG. 11, a recording member 80 was placed on a turn table 81, which was rotated by means of a motor 82, and the turn table was simultaneously moved in linear directions (shown by the numeral 83). A laser beam 84 was condensed on the surface of the recording layer so as to be about 3 microns in spot size to carry out a recording of spiral shape. The sensitivity was calculated as being the limit point to which the linear velocity at the circumference of the turn table was increased until it became impossible to effect recording.

The optical system for condensing the laser beam was composed of laser 76, a beam expander 77, a mirror 78 and a microscope objective lens 79, and the light loss due to the optical system was 70% in the visible light region and 75% in the infrared region.

As understood from the given table, in the case of the laminate, its sensitivity was improved in to a great extent. This fact is practically very important, and on account of this, it becomes possible to apply the recording member to a computer output microfilmer (COM), microfilmer and the like. In addition, the large reciprocity law failure of the recording member is caused to take place by dependence of the sensitivity on the laser power as seen from the foregoing table.

EXAMPLE 4

A bismuth (Bi) layer was formed under the same conditions as those in Example 3 and further, a GeS$_2$ layer was formed thereon under the following conditions.

| Material | GeS$_2$ |
|---|---|
| Vaporization amount | 200 mg, 300 mg, 500 mg. |
| Boat material | Ta |
| Boat temperature | Not measured |
| Boat input | 90 A |
| Support material | Bi-deposited film |
| Support temperature | Room temperature |
| Distance* | 22–32 cm (Support is rotated during deposition) |
| Vacuum degree | About $1.5 \times 10^{-5}$ Torr |
| Deposition time | 1–2 min. |
| Thickness | About 2000Å, 3000Å, 5000Å |

*Distance between vaporization source and support.

Figure 9:
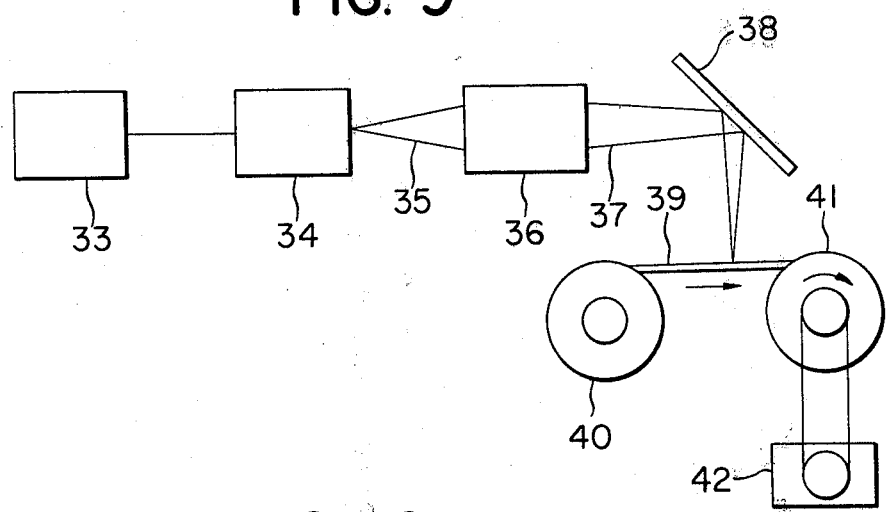

The recording member thus obtained was compared with the Bi layer with respect to the spectral total reflectivity to show the comparison in FIG. 9. The recording member having the GeS$_2$ of 3000 Å in thickness absorbed about 80% of the HeNe laser, which resulted in an increase in the absorption energy by about 2.7 times, as compared with the case in which the laser was directly applied to the surface of the Bi layer. The sensitivity of this recording member was measured in the same manner as that in Example 3, so that it was found to be $1.5 \times 10^6$ erg/cm$^2$ with respect to the He-Ne laser of 200 mW, which is an increase by about 4 times as compared with the Bi layer alone.

In addition, the Bi deposited film was weak both in surface strength and adhesion strength, and therefore, it is susceptible to mechanical damage, for example by scratching it slightly with paper, and is liable to peel off out of the support by scratching it somewhat stronger. Furthermore, when a chalcogenide material was vapor-deposited onto the surface of the laminate obtained in Examples 3 and 4, the laminate was greater in the strength of the film and not susceptible to damage, and it exhibited an extremely large durability.

EXAMPLE 5

An acetate film having a thickness of 80 microns was used as a support, and a GeS$_2$ layer having a thickness of about 2000 Å was first formed thereon as an intermediate layer under substantially the same conditions as those in Example 4. The formed layer is substantially uniformly transparent to visible light. After the formation of the intermediate layer, a Bi layer having a thickness of 500 Å and a GeS$_2$ layer having a thickness of 3000 Å were further formed under the same condition to prepare a recording member. The recording member was substantially the same as that prepared in Example 4 in terms of sensitivity, and further, its recording layer was large in both adhesion strength and surface strength, and had a durability sufficient for practical use.

The recording member was observed by the transmission mode as shown in FIG. 7 (a) and (b), and it was found that the image contrast was about 2.0 in the difference in the quantity of the transmitted light.

EXAMPLE 6

The same recording member as that in Example 3 was prepared in the same manner, except that the thickness of the Ge$_{50}$S$_{50}$ was controlled so as to be 1700 Å, and when the Ge$_{50}$S$_{50}$ was vapor-deposited, a portion of the surface of the Bi layer was covered with a mask to form a portion having no Ge$_{50}$S$_{50}$ layer.

The recording member was subjected to recording by using the same sensitivity measuring apparatus as that used in Example 3. In this case, a He-Cd laser having an output of 10 mW and a microscope objective lens having 40 magnifications were used as the light source and the condensing objective lens, respectively, and the turn table was rotated at a speed of 341 rpm.

As a result, a spiral line was recorded. From a sensitivity point of view, it was possible to carry out the recording up to the peripheral portion of the recording member at which the circumferential speed was the highest. However, the objective lens was defocussed. In other words, the recording member was caused to be slightly out of the focus of the objective lens in order to carry out recording. As a result, the difference in the situation of the recorded portion between the Bi layer alone and the recording layer of the present invention could be clearly recognized by observation using a microscope. When the border between the Bi layer-exposed portion and the portion having the Ge$_{50}$S$_{50}$ layer was observed in the inner portion thereof, it was found that although a line was recorded on both portions, the recorded line in the Bi layer-exposed portion was not constant in line width and the line edge was blurred. On the other hand, in the portion having the Ge$_{50}$S$_{50}$ layer, the line width was larger than that in the Bi layer-exposed portion, and the line edge was very sharp. Such tendency was further remarkable in the outer portion. In the most outer portion, recording in the Bi layer-exposed portion was not carried out, while in the portion having the Ge$_{50}$S$_{50}$ layer, a sharp line was recorded. In view of the foregoing, it was found that the recording member of the present invention has very excellent sensitivity, resolution power and image quality.

EXAMPLE 7

A recording member was prepared under the conditions given below.

| | Radiation absorption layer | Anti-reflection layer |
|---|---|---|
| Material | Au | Ge$_{50}$S$_{50}$ |
| Material form | Wire | Block |
| Vaporization amount | 190 mg | 230 mg |
| Boat material | W (10 mm in width) | Ta |
| Boat temperature | About 1550° C. | Not measured |
| Boat input | 47 Å | 85 Å |
| Support material | Polyester film (75μ in thickness) | Au-deposited film |
| Support temperature | Room temperature | 20° C. |
| Distance* | About 20 cm | About 26 cm |
| Vacuum degree | 3 × 10$^{-6}$Torr | 4 × 10$^{-6}$Torr |
| Deposition time | Not measured | 5 min. |
| Thickness | 800–1000Å | 4200Å |

*Distance between vaporization source and support.

Figure 10:
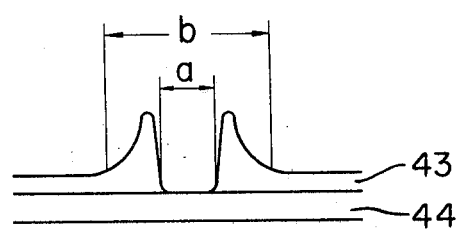

The spectral total reflectivity of the recording layer thus obtained and the above-mentioned Au layer is shown in FIG. 10 for comparison. With respect to the given wavelength of the HeNe laser, the absorption quantity of the He-Ne laser in the recording layer was about 17 times as large as that in the Au layer alone, and the sensitivity of the recording layer was about 50 times as high as the Au layer alone.

It is well known that an Au deposited film is liable to peel off and is susceptible to mechanical damage. However, when the Ge$_{50}$S$_{50}$ layer was formed on the Au film, such damage was hardly formed and a durable film obtained.

EXAMPLE 8

In the procedure of Example 7, In, Sn and Zn were separately substituted for Au and could be easily formed into layers having a thickness about 800 Å, although the respective deposition conditions were different to some extent. Further, Ge$_{50}$S$_{50}$ was applied to them in the same manner. A good result was obtained.

EXAMPLE 9

An Si layer and Rh layer were formed by electron beam vapor deposition under the following conditions.

| Material | Si | Rh |
|---|---|---|
| Distance | 19 cm | 40 cm |
| Vacuum degree | 10$^{-6}$Torr (upon starting deposition) | The same as left |
| Beam power | About 5KV × 50mÅ | 9KV × 40mÅ |
| Type of electron gun | Static field deflection type | X—Y deflecting type |
| Thickness | 3000Å | 600Å |

The above-mentioned materials could be formed into layers by sputtering.

A GeS$_2$ layer was formed on the above-mentioned layers in the same manner as that in Example 4 to attain an increase of sensitivity by 3–10 times.

EXAMPLE 8

As a chalcogen material, Ge$_2$S$_3$, Sn$_{12}$Ge$_{23}$S$_{63}$, Sn$_{16}$Ge$_{17}$S$_{67}$, Sn$_{25}$Ge$_7$S$_{68}$, Sn$_7$Ge$_{16}$S$_{77}$, In$_{14}$Ge$_{29}$S$_{57}$, In$_{20}$Ge$_{20}$S$_{60}$, In$_{30}$Ge$_{10}$S$_{60}$, In$_{10}$Ge$_{20}$S$_{70}$, Ag$_{25}$Ge$_{25}$S$_{50}$, Ag$_{33}$Ge$_{17}$S$_{50}$, Ag$_{10}$Ge$_{35}$S$_{55}$, Ag$_{20}$Ge$_{15}$S$_{65}$, Ag$_5$Ge$_{23}$S$_{72}$, Cu$_{14}$Ge$_{29}$S$_{57}$ and Cu$_{33}$Ge$_{17}$S$_{50}$ layers having a thickness of 1000–5000 Å were formed on various radiation absorption layers under substantially the same deposition condition as that in the preparation of the layer of the chalcogen material in Examples 3 and 4 so that recording members suitable for wavelengths of various lasers were obtained. In addition, the deposition of the ternary compounds was carried out by flask evaporation.

EXAMPLE 11

A WO$_3$ layer was formed on the Bi layer obtained in Example 3 and the Au layer in Example 7 under the condition shown below.

| Material | WO$_3$ (7.16g/cm$^3$ in specific gravity |
|---|---|
| Support temperature | Room temperature |
| Distance* | 35 cm |
| Vacuum degree | 0.9 × 10$^{-6}$Torr (initial) |
| | 1-5 × 10$^{-5}$Torr (during deposition) |
| Electron beam Acceleration voltage | 9 KV |
| Beam current | 100 mÅ or less |
| Scan frequency | 9 times/sec. (in each of lengthwise and crosswise) |
| Scan area | About 1 cm × 1 cm |
| Deposition rate | 100–1000Å/sec. |
| Support revolution | 50 rpm |
| Deposition time | 2.9 min. |

| | |
|---|---|
| Vaporization amount | 7 g |
| Thickness | 7200Å |

*Distance between vaporization source and support.

The result of the test with respect to the above-mentioned recording layers was shown in the following table in comparison with the single layers of Bi and Au.

| Recording layer | Specified wavelength | Increase in absorption | Increase in sensitivity |
|---|---|---|---|
| Bi + WO$_3$ | He—Cd laser (442 mµ) | 1.7 times | 2 times |
| | Ar laser (488 mµ) | 2.0 times | 3 times |
| Au + WO$_3$ | Ar laser (488 mµ) | 1.5 times | 2 times |

EXAMPLE 12

In the same manner as in Example 3, an anti-reflection layer of Ge$_{50}$S$_{50}$ having a thickness of about 350 Å was formed on a Bi layer having a thickness of 1 micron to prepare a sample. The sample was subjected to the laser beam recording under the same conditions as in Example 3. Thereafter, the sample was immersed in deionized water, ethyl alcohol, acetone and methyl ethyl ketone so that only the anti-reflection layer of Ge$_{50}$S$_{50}$ was dissolved, and it was recognized that the surface of the Bi layer was etched so that a line pattern having a width of 10 microns and a depth of 2000 Å was formed. With respect to the dissolving rates of the Ge$_{50}$S$_{50}$ layer (350 Å in thickness) in the above-mentioned solvents, those in water, ethyl alcohol, acetone and methyl ethyl ketone increase in the named order of the solvents. In addition, such layer was immersed in trichloroethylene and toluene, but was not dissolved. Further, even after a lapse of 24 hours, no change could be observed.

EXAMPLE 13

An anti-reflection layer of WO$_3$ was formed on an Al foil having a thickness of about 10 microns by vapor-deposition under the following conditions.

| | |
|---|---|
| Material | WO$_3$ (7.16g/cm$^3$ in specific gravity) |
| Support temperature | Room temperature |
| Distance* | 35 cm |
| Vacuum degree | 0.9 × 10$^{-6}$Torr (initial) |
| | 1–5 × 10$^{-5}$Torr (during deposition) |
| Electron beam | |
| Acceleration voltage | 9 KV |
| Beam current | 100 mA or less |
| Scan frequency | 9 times/sec. (in each of lengthwise and crosswise) |
| Scan area | About 1 cm × 1 cm |
| Deposition rate | 100–1000Å/sec. |
| Support revolution | 50 rpm |
| Deposition time | 29 min. |
| Vaporization amount | 7 g |
| Thickness | 7200Å |

*Distance between vaporization source and support.

The sensitivity of the laminate was measured in the same manner as that described in Example 3 to find that the relative sensitivity was about two times as high as that of the radiation absorption layer alone. After laser recording of the recording member, the removal of the WO$_3$ layer was carried out by using a 0.5 N—KOH solution so that only the WO$_3$ layer was dissolved for about one minute.

EXAMPLE 14

A Bi layer having a thickness of 500 Å was formed on a polyester film having a thickness of 75 microns, the product of which was used as a support to carry out vapor-deposition as shown in the following table.

| | |
|---|---|
| Material | GeS |
| Material form | Block |
| Vaporization amount | 50 mg |
| Boat material | Ta (20 mm in width) |
| Boat temperature | About 700°C. |
| Boat input | 75A |
| Support temperature | Particularly not-heating |
| Distance* | 22–32 cm (rotation type) |
| Deposition pressure | About 10$^{-5}$ Torr |
| Deposition time | About 4 min. (between opening of shutter and closing thereof) |
| Thickness | About 500Å |

*Distance between vaporization source and support.

Figure 12:
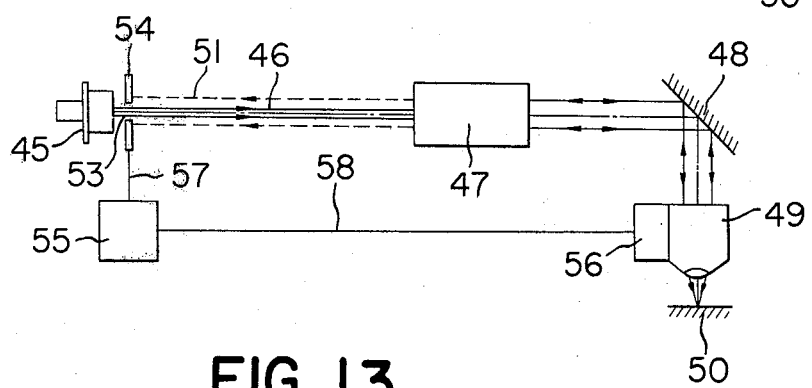
FIGS. 12 and 13 show conditions for producing an anti-reflection layer for the recording member of the present invention.

A He-Ne laser having a wavelength of 6328 Å and an output of 1 mW was used to measure directly the reflectivity of the deposited film, the result of which is shown in FIG. 12.

In the Figure, when the reflectivity became minimum and again increased to some extent, the shutter was closed. However, it is the most preferable to close the shutter at the minimum point of the reflectivity. In this procedure, it was confirmed that the reflectivity with respect to the specified laser wavelength could be controlled with accuracy. In addition, it was found that about 36.5 mg in 50 mg of the vaporization material was vapor-deposited.

EXAMPLE 15

A Bi-Sn alloy having a thickness of about 400 Å formed on a polyester film having a thickness of 75 microns was used as a support to carry out the following vapor-deposition. In addition, the Bi-Sn alloy was predominantly composed of Sn and the amount of the Bi was considerably small.

| | |
|---|---|
| Material | GeS$_2$ |
| Material form | Particle, Powder |
| Vaporization amount | 500 mg |
| Boat material | Ta (10 mm in width) with a lid |
| Boat temperature | Not measured |
| Boat input | 90A |
| Support temperature | Particularly not heating |
| Distance* | 22–32 cm (rotation type) |
| Deposition pressure | About 10$^{-5}$ Torr |
| Deposition time | About 2 min. (between opening of shutter and closing thereof) |
| Thickness | About 500Å |

*Distance between vaporization source and support.

Figure 13:

A beam of argon laser having a wavelength of 4880 Å and an output of about 1 mW was used to measure directly the reflectivity of the deposited film. The result shown in FIG. 13. The actually deposited GeS$_2$ was about 40 mg.

Further, in this procedure, the reflectivity with respect to the specified wavelength of the laser (in this example, 4880 Å for an argon ion laser), therefore the sensitivity could be controlled so as to be a desired value with accuracy.

EXAMPLE 16

GeS$_2$ was vapor-deposited to the Bi layer having a thickness of 300 Å formed on a polyester film under substantially the same conditions as that in Example 15. The sensitivity of the resulting recording member was monitored by using an argon ion laser. The result is shown by the dotted line in FIG. 13.

EXAMPLE 17

The Au layer having a thickness of 1000 Å formed on a polyester film having a thickness of 75 microns was used as a support to carry out the following electron beam vapor-deposition.

| Material | WO$_3$ (7.16 g/cm in specific gravity) |
|---|---|
| Support temperature | Particularly not heating |
| Distance | 35 cm |
| Vacuum degree | 0.9 × 10$^{-6}$ Torr (initial) |
| | 1-5 × 10$^{-5}$ Torr (during deposition) |
| Electron beam | 9KV (acceleration voltage) |
| | 100mA or less (beam current) |
| Scan frequency | 9 times/sec. (in each of lengthwise and crosswise) |
| Scan area | About 1 cm × 1 cm |
| Deposition rate | 100-1000Å/sec |
| Support revolution | 50 rpm |

The vapor-deposition was started under the above-mentioned conditions and the surface reflectivity of the recording member was monitored by using an argon laser having a wavelength of 4880 Å. After a lapse of about three minutes, the surface reflectivity decreased up to 11%, and therefore, the vapor-deposition was stopped by means of the shutter.

We claim:

1. A method of recording information comprising the steps of:
   forming information bearing high intensity radiation; and
   applying the high intensity radiation to a nonpoisonous recording member having a recording layer which absorbs the high intensity radiation, said recording layer comprising a radiation absorption layer, and an anti-reflection layer comprising a compound consisting of S and Ge and capable of preventing the reflection of the radiation applied to the radiation absorption layer wherein the radiation absorption layer deforms in response to the heat caused by the absorption of the radiation, and the anti-reflection layer deforms in response to said heat to define the recorded information, wherein said high intensity radiation forms a spot or hole on the recording member no greater than about 1.5 microns in diameter.

2. A method of recording according to claim 1, further comprising the step of removing the remaining anti-reflection layer after the application of the high intensity radiation.

3. A method according to claim 1, wherein the transmissivity of the anti-reflection layer for radiation of the same wavelength as that of the high intensity radiation is higher than that of the radiation absorption layer.

4. A method according to claim 1, wherein the thickness of the anti-reflection layer is less than one micron.

5. A method according to claim 1, wherein the thickness of the radiation absorption layer is from 50 to 5000 Å.

6. A method according to claim 1 in which the heat of vaporization of the radiation absorption layer is less than 10 Kcal/cm$^3$.

7. A method according to claim 1, wherein the anti-reflection layer reduces the reflectivity of the radiation absorption layer as to radiation of the same wavelength as that of the high intensity radiation to less than ½.

8. A method according to claim 1, in which the radiation absorption layer is metal.

9. A method according to claim 1, wherein there are two anti-reflection layers and the radiation absorption layer is between them.

10. A method according to claim 1, wherein the high intensity radiation is laser light.

* * * * *

UNITED STATES PATENT AND TRADEMARK OFFICE
CERTIFICATE OF CORRECTION

PATENT NO. : 4,335,198
DATED : June 15, 1982
INVENTOR(S) : HIROSHI HANADA, ET AL.

It is certified that error appears in the above-identified patent and that said Letters Patent is hereby corrected as shown below:

Column 6, line 11, after "a" insert --different--;
line 14, "Ti" should read --Tl--.

Column 13, line 32, "Bi(500Å)" should read --Bi(500Å)--;
line 33, "2900Å" should read --2900Å--;
line 34, "Bi(500Å)" should read --Bi(500Å)--;
line 35, "1650Å" should read --1650Å--;
line 36, "Bi(500Å)" should read --Bi(500Å)--.
line 57, "in" should be deleted.

line 28, "50mÅ" and "40mÅ" should read --50mÅ-- and --40mÅ--, respectively.

Signed and Sealed this

Fifteenth Day of March 1983

[SEAL]

Attest:

GERALD J. MOSSINGHOFF

Attesting Officer  Commissioner of Patents and Trademarks